(No Model.)
T. F. HIND & R. LUND.
APPARATUS FOR DRESSING FLOUR, MIDDLINGS, &c.
No. 264,159. Patented Sept. 12, 1882.
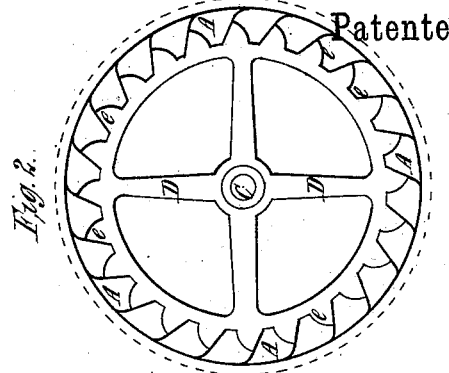
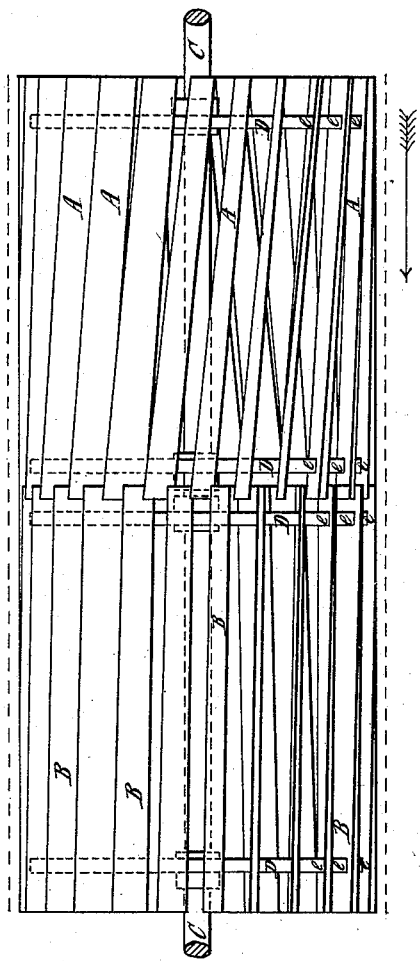
Attest:
F. W. Coward
D. P. Cowe
Inventors;
Thos. Frederick Hind
& Robert Lund
by W. K. Doolittle, Atty

UNITED STATES PATENT OFFICE.

THOMAS F. HIND AND ROBERT LUND, OF PRESTON, COUNTY OF LANCASTER, ENGLAND.

APPARATUS FOR DRESSING FLOUR, MIDDLINGS, &c.

SPECIFICATION forming part of Letters Patent No. 264,159, dated September 12, 1882.

Application filed May 16, 1882. (No model.) Patented in England February 17, 1881, No. 687; in Germany September 18, 1881, No. 18,355, and in Austria-Hungary December 10, 1881, No. 31,710.

*To all whom it may concern:*

Be it known that we, THOMAS FREDERICK HIND and ROBERT LUND, subjects of the Queen of Great Britain, both of Preston, in the county of Lancaster, Kingdom of Great Britain and Ireland, have invented a new and useful improvement in machinery or apparatus for dressing flour, middlings, wheat-meal, and ground or crushed grain or seeds, (for which we have obtained a patent in Great Britain, No. 687, bearing date February 17, 1881; also a patent in Austria, dated December 10, 1881; also a patent in the German Empire, bearing date September 18, 1881,) of which the following is a specification.

This invention relates to that kind of machine or apparatus for dressing flour, middlings, wheat-meal, and ground or crushed grain or seeds known as a "centrifugal dressing-reel," in which the flour or other ground or crushed substance is supplied to the interior of a revolving cylinder whose periphery is covered with silk strained tightly thereupon, while within the cylinder a series of revolving beaters rotating at a greater speed than the outer cylinder causes the flour or other material to be thrown or beaten against the silk, which, acting as a sieve, separates the finer material from the coarser. The revolving beaters usually consist of blades of wood or sheet metal running the full length of the outer cylinder, and mounted upon the extremities of arms radiating from a central axis. In some cases the blades are arranged parallel to the axis, while in others they are arranged helically or diagonally, so that the progress of the material through the cylinder is hastened after it has passed over a portion of the silk-covered reel. This effect is produced by arranging the blades of the beater in its first section—that which operates within the receiving end of the reel—parallel to the beater-shaft. In such an arrangement of centrifugal dressing-reels it is found in practice that the silk at that end of the cylinder at which the material is fed or supplied has the greatest amount of work to perform, and is consequently worn through much sooner than the silk at the tail end of the cylinder. Now, according to our invention, instead of mounting the beaters in one uniform position or direction, as above described, we divide them longitudinally into two or more sections and arrange the blades of each section in varying directions, the blades of the first section—that is to say, the section at that end of the cylinder to which the material is supplied—being set at a greater angle relatively to the axis than the blades of the next section, and so on. The blades of the last section may be almost parallel to the axis.

In the accompanying drawings, Figure 1 represents a side view, and Fig. 2 an end view, of our improved arrangement of revolving beaters, as above described.

A A are the blades or beaters at that end of the cylinder (shown by dotted lines) at which the material is supplied, and B B the blades or beaters at the outlet or tail end. It will be seen that the blades A A are set more out of line with the shaft C than the blades B B, the latter being set at such an angle as to cause the material being operated upon to be moved toward the outlet or tail end of the cylinder, in the direction indicated by the arrow in Fig. 1, at a slower speed than while under the action of the blades A A.

D D are pulleys having on their peripheries lugs or ears *e e*, to which the blades A A B B may be secured by screw-bolts or other convenient means. By varying or graduating the direction of the beaters, as above described, the progress of the material is accelerated at the supply end of the cylinder and retarded at the tail end, thus distributing more equally over the entire length of the cylinder the work to be performed.

It will be evident that more than two sections of blades or beaters, as shown in the drawings and hereinabove described, may be employed, and that the blades or beaters of any convenient number of sections may be arranged to follow each other at gradually-decreasing angles relatively to the central shaft or axis, so as to cause the material being dressed to be moved forward at a gradually-decreasing speed from the supply end to the outlet or tail end of the dressing-cylinder.

Heretofore beaters have been employed the blades of which have been arranged at different angles to their shafts, so as to gradually retard the progress of the flour, and short inwardly-projecting arms curved in greater inclination than the blades have been employed to hasten the passage of the flour, and neither of these constructions is claimed as of our invention.

What we claim is—

In a machine for dressing flour, middlings, or other crushed or ground grain or seeds, the combination of a dressing-reel and a beater adapted to revolve therein, and comprising a series of blades arranged in sections, the blades of each of which are parallel and inclined at gradually-decreasing angles to the beater shaft from the receiving to the delivery end of the cylinder, whereby unnecessary wear of the textile covering of the cylinder at the receiving end thereof is avoided, substantially as shown and described.

THOMAS FREDERICK HIND.
ROBERT LUND.

Witnesses:
YATES W. BOOTH,
WILL. MELLING,
   *Both of Preston.*